US00RE34120E

United States Patent [19]

Plahn

[11] E Patent Number: Re. 34,120

[45] Reissued Date of Patent: Nov. 3, 1992

[54] ARTICLE HOLDING BRACKET

[75] Inventor: Katherine C. Plahn, Maple Grove, Minn.

[73] Assignee: DF&R Corporation, Farmington Hills, Mich.

[21] Appl. No.: 725,753

[22] Filed: Jul. 2, 1991

Related U.S. Patent Documents

Reissue of:

[64] Patent No.: 5,016,850
Issued: May 21, 1991
Appl. No.: 571,177
Filed: Aug. 23, 1990

[51] Int. Cl.[5] ..... F16B 47/00

[52] U.S. Cl. ..... 248/206.3; 248/288.5; 403/90

[58] Field of Search ..... 248/206.3, 206.4, 206.2, 248/205.5, 205.6, 205.7, 288.3, 288.5; 403/90, 76, 77, 141, 143

[56] References Cited

U.S. PATENT DOCUMENTS

| | | | |
|---|---|---|---|
| 1,280,013 | 9/1918 | Goddard | 403/90 X |
| 2,167,962 | 8/1939 | Sovis | 248/288.5 |
| 3,554,582 | 1/1971 | Yamashita et al. | 403/90 X |
| 3,900,180 | 8/1975 | McPhee | 248/288.3 |
| 4,037,229 | 7/1977 | Dunk | 248/288.3 X |
| 4,066,231 | 1/1978 | Bahner et al. | 248/288.3 X |
| 4,648,572 | 3/1987 | Sokol | 248/206.2 |
| 4,760,497 | 7/1988 | Roston | 361/427 |
| 4,836,482 | 6/1989 | Sokol | 248/206.3 |
| 4,863,130 | 9/1989 | Marks, Jr. | 248/206.3 |
| 4,896,855 | 1/1990 | Furnish | 248/206.3 |
| 4,899,975 | 2/1990 | Suman | 403/90 X |
| 4,923,162 | 5/1990 | Fleming et al. | 248/288.3 X |
| 5,016,850 | 5/1991 | Plahn | 248/206.3 |
| 5,020,754 | 6/1991 | Davis et al. | 248/206.3 |

*Primary Examiner*—Ramon O. Ramirez
*Attorney, Agent, or Firm*—Patterson & Keough

[57] ABSTRACT

A windshield mounted bracket to removably and adjustably hold a radar detector including suction cups for removable windshield attachment, an adjustable strap bracket having flanged bottoms to seat into corresponding grooves in side walls of the detector housing and a rotatably adjustable connecting ball hinge.

12 Claims, 2 Drawing Sheets

FIG. 1
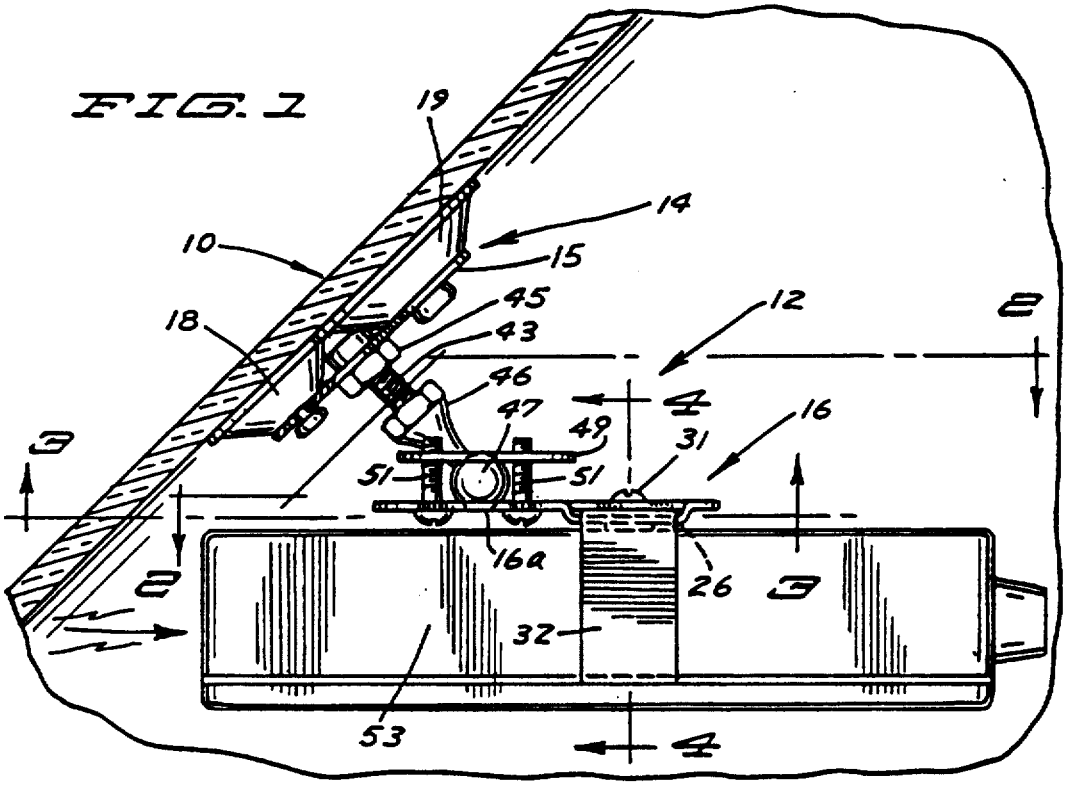
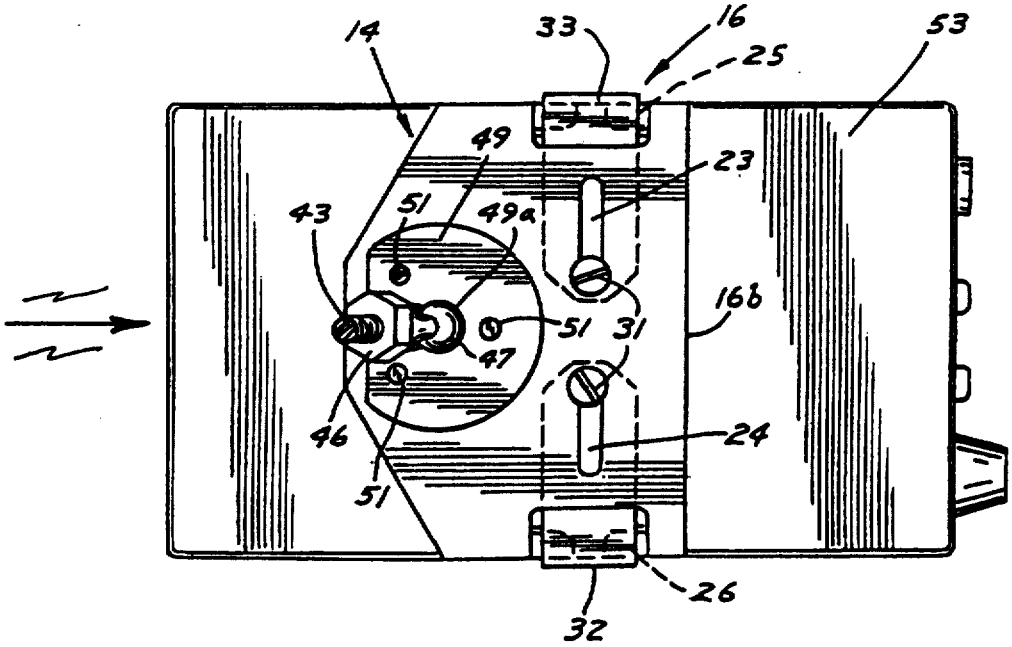
FIG. 2

ARTICLE HOLDING BRACKET

Matter enclosed in heavy brackets [ ] appears in the original patent but forms no part of this reissue specification; matter printed in italics indicates the additions made by reissue.

BACKGROUND OF THE INVENTION

1. Field of the Invention

Relates to a horizontally and vertically rotatably adjustable windshield mountable bracket for a radar detector.

2. Brief Description of the Prior Art

A radar detector is a popular item as an accessory in a motor vehicle. It is an item of significant value and it is well not to have it openly exposed while a vehicle is parked in a public area.

In order to keep such a device from public view, costly remote mounted detectors with dashboard and under dashboard controls have been provided but these controls obstruct free movement of the body in under the dashboard area or project outwardly from the dash in an obstructing manner.

Brackets to hold detectors are windshield mounted or clipped onto the windshield visor and either have a nonadjustable angular relationship between the bracket mount and the support portion of the bracket or have a linear hinge with a limited adjustment to hold the detector.

The above and other disadvantages are overcome by the bracket structure of the present invention.

SUMMARY OF THE INVENTION

It is an object of the present invention to provide substantial improvement in a bracket structure to retain a radar detector.

In a further object bracket provides a swivel or universal adjustment between the mounting plate attached to a windshield and the supporting plate which carries the radar detector.

The swivel joint in the bracket is a ball joint which together with a transversely adjustable strap bracket to retain a radar detector provides a substantial improvement in known bracket structures.

The instant bracket provides further improvement by permitting adjustment in any desired direction.

These and other objects and advantages of the invention will be set forth in the following description made in connection with the accompanying drawings in which like reference characters refer to similar parts throughout the several views.

DESCRIPTION OF THE DRAWINGS

FIG. 1 is a view in vertical section of a windshield and in side elevation of the invention herein, mounted thereon;

FIG. 2 is a view in section and in plan taken on line 2—2 of FIG. 1 as indicated;

DESCRIPTION OF A PREFERRED EMBODIMENT

Figure 3:
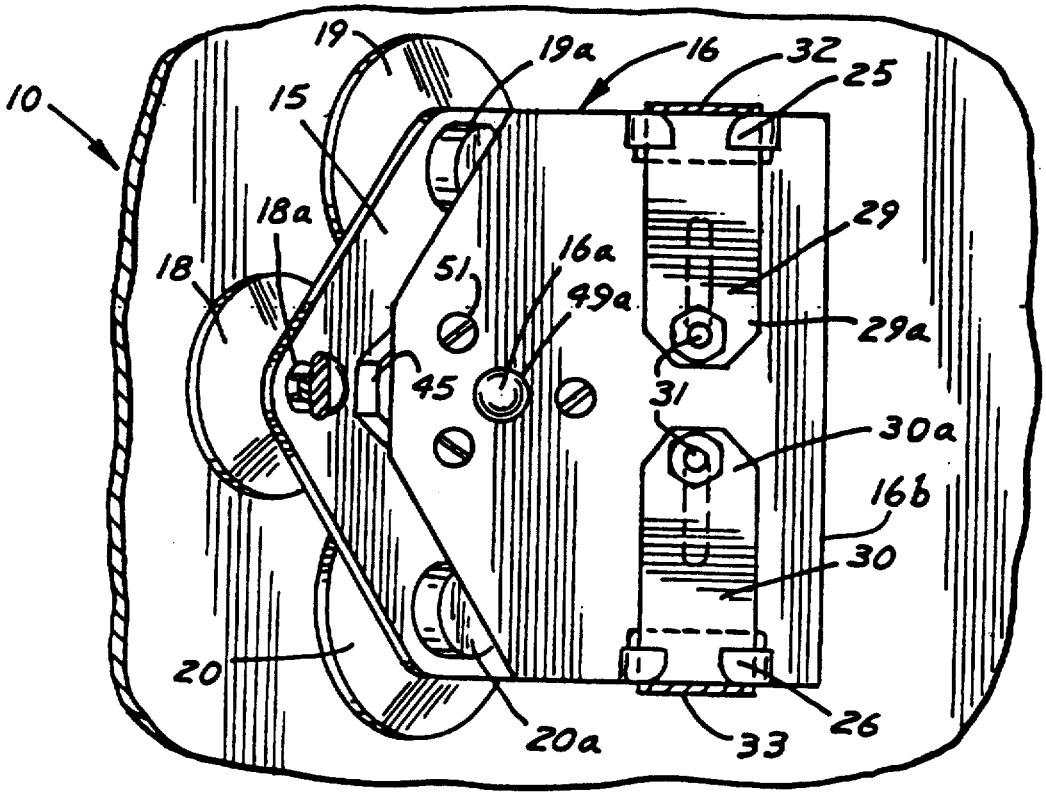
FIG. 3 is a view in bottom plan taken on line 3—3 of FIG. 1 as indicated.

Referring to the drawings, in FIG. 1, a windshield 10 of an automotive vehicle is shown and mounted thereon in operating position is the bracket 12 which comprises the invention herein.

The bracket has two separated operating parts, a windshield mount or mounting plate structure 14 and a radar detector supporting plate structure 16 and these two parts are operatively connected by a universal swivel joint connecting structure 17.

Said mounting plate structure 14 comprises a flat plate member 15 substantially triangular in plan having mounted on the outer face portion thereof, as here shown, three suction cups 18, 19 and 20 at each apex of said plate member. Said suction cup 18 is secured to said plate member for self-adjustment therewith and in the instant embodiment is shown having a loose fitting rivet connection 18a therewith to adapt to the curvature of a windshield. The other two suction cups are connected to said plate member by conventional plastic rivets 19a and 20a.

The supporting plate member 16 is substantially rectangular in plan having beveled forward edges and having therethrough transversely thereof and spaced inwardly from the rear end 16b thereof a pair of separated transverse slots 23 and 24. At each side of said supporting plate or support member in alignment with said slots are upset angled pairs of facing side edge portions 25 and 26 forming support slots or channels through which extend strap members 29 and 30 having their inner spaced apart end portions 29a and 30a respectively overlying said slots and each end portion having a headed screw 31 extending through its respective slot and itself to be secured by nuts for lateral adjustment. Said strap members have right angled portions or arms 32 and 33 extending downwardly and respectively having their lower ends 32a and 33a angled inwardly to form flanges which are received in accommodating grooves at each side of a radar detector 53 as indicated at 54 and 55.

Now will be described the structure 17 operatively connecting said mounting plate and said support member.

Substantially centrally of said plate 15 is a bolt 43 extended downwardly therethrough and the same is secured by a lock nut 45 threaded thereon at the underside of said plate 15.

The extended portion of said bolt is threaded into the upwardly flared sleeve 46 of a ball 47, said ball being the swivel portion of the joint. Said ball is retained between a pair of parallel spaced plates. The lower plate member is formed by a portion of the plate 16 and spaced thereabove is an upper retaining plate which is shown as a substantially circular plate 49. Said plates are held in vertically spaced relation by three bolts 51 as shown.

Said plates are apertured at 16a and 49a to have portions of said ball extend partially therethrough in forming a bearing surface for said ball. Said bolts adjust the tension on said ball to control the vertical and horizontal rotational movement thereof in providing a universally rotational adjustment of said support member relative to said windshield mounting plate.

Figure 4:
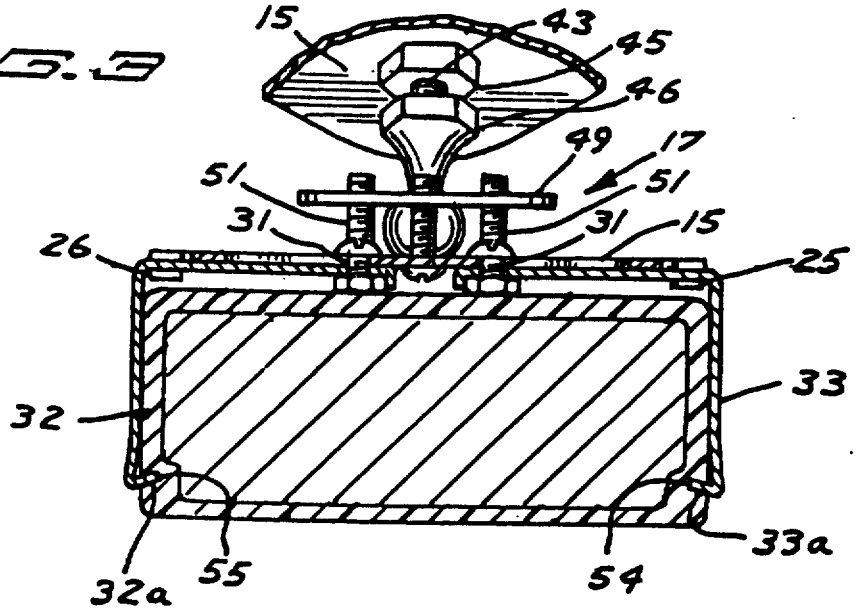
FIG. 4 is a view in vertical section taken on line 4—4 of FIG. 1 as indicated.

Referring to FIG. 4, said radar detector is shown in operating position as held by the flanges 32a and 33a and by a sliding movement is readily inserted into or removed from its operating position. Said strap sides 32 and 33 will have sufficient flexibility to apply a snug holding tension onto the side grooves which exist on most radar detectors.

In FIG. 1, said bracket is shown retaining radar detector 53 in an operating position. The angular relationship between the support plate 16 with the radar detector held thereby and the mounting plate 15 is readily adjusted by simply manually tilting said support plate into any desired position any desired degree.

The vertical spacing between the mounting and support plates 15 and 16 is adjusted by the extend to which the bolt 43 is threaded into said sleeve 46.

The bracket by the use of suction cups is very easily mounted onto a windshield and the suction cup 18 has a loose fitting connection with the plate member 15 for a self adjusting seating of the mounting plate to accommodate the curvature of a windshield.

When the vehicle having this bracket therein is parked in a public area, the bracket is very readily removed from its mounting onto the windshield and may be placed on the floor of the vehicle or under the front seat as not to be seen as this bracket and the radar detector are very likely objects for theft event to the extent of having a car window broken to be reached.

Thus a very adaptable bracket is provided for easy mounting and for universal adjustment which represents substantial improvement over other known brackets and which provides ready adjustment to adapt to the width of a radar detector to retain the same.

It will of course be understood that various changes may be made in form, details, arrangement and proportions of the product without departing from the scope of the invention which, generally stated, consists in a product capable of carrying out the objects above set forth, in the parts and combination of parts disclosed and defined in the appended claims.

What is claimed is:

1. A bracket removably mounting a radar detector on the windshield of an automotive vehicle, having in combination a planar windshield mounting plate member, means carried by said plate member releasably securing the same to said windshield, a supporting plate member retaining a radar detector comprising a planar top wall, spaced inwardly from the rear end of said top wall are a pair of separated transversely aligned slots, a pair of extensible strap members disposed transversely of said top wall having their respective adjacent end portions overlying said slots, securing means extending through each of said adjacent ends and the respective slots thereof, the remote end portions of said strap members respectively extending downwardly depending from the side edges of said top wall, the lower end portions of said depending strap portions being angled inwardly in facing relationship forming flanges, said flanges being arranged to be disposed in grooves respectively at each side of a radar detector, a universally pivotal swivel means connecting said mounting plate member and said supporting plate member in operating relationship, said swivel means comprises a bolt secured to said mounting plate member extending downwardly therefrom, a plate member spaced above said top wall of said supporting plate member, a plurality of bolts holding said spaced plate members in spaced relation, said spaced plate members having aligned apertures, a ball disposed between said spaced plate members and extending into said apertures, said ball having an upwardly extending internally threaded sleeve, said bolt being threaded into said sleeve operatively connecting said mounting plate member and said support plate member, said bolts adjusting the tension upon said ball between said spaced plate members, and whereby said support plate member is universally rotatable vertically and horizontally relative to said mounting plate member.

2. A bracket removably mounting a radar detector on the windshield of an automotive vehicle, having in combination a planar windshield mounting plate member, means carried by said plate member releasably securing the same to said windshield, a supporting plate member retaining a radar detector comprising a planar top wall, spaced inwardly from the rear end of said top wall are a pair of separated transversely aligned slots, a pair of extensible strap members disposed transversely of said top wall having their respective adjacent end portions overlying said slots, securing means extending through each of said adjacent ends and the respective slots thereof, the remote end portions of said strap members respectively extending downwardly depending from the side edges of said top wall, the lower end portions of said depending strap portions being angled inwardly in facing relationship forming flanges, said flanges being arranged to be disposed in grooves respectively at each side of a radar detector, a universally pivotal swivel means connecting said mounting plate member and said supporting plate member in operating relationship, said swivel means comprises a bolt secured to said mounting plate member extending downwardly therefrom, a plate member spaced above said top wall of said supporting plate member, a plurality of bolts holding said spaced plate members in spaced relation, said spaced plate members having aligned apertures, a ball disposed between said spaced plate members and extending into said apertures, said ball having an upwardly extending internally threaded sleeve, said bolt being threaded into said sleeve operatively connected said mounting plate member and said support plate member, said bolts adjusting the tension upon said ball between said spaced plate members, whereby said support plate member is universally rotatable vertically and horizontally relative to said mounting plate member, and means locking said bolt relative to said mounting plate member to prevent relative movement therebetween.

*3. An apparatus adapted for removably mounting an article on an interior surface of the passenger compartment of an automotive vehicle, comprising:*

*mounting means for operably detachably coupling said apparatus to said interior surface of said passenger compartment;*

*supporting means for operably detachably engaging said article; and*

*joint means for operably coupling said mounting means and said supporting means, said joint means including swivel means for selectively controlling the orientation of said supporting means relative to said mounting means along a plurality of rotational axes, said supporting means including a mounting member operably coupled to said joint means and transversely adjustable bracket means shiftably, operably carried by said mounting member for operable engagement of said article, whereby said article is shiftably positionable relative to said mounting member and said mounting member is swivelable relative to said mounting means such that said article is rotationally and transversely positionable relative to said mounting means.*

*4. The apparatus of claim 3, wherein said mounting means comprises a member having suction means for releasably securing said plate member to said interior surface.*

*5. The apparatus of claim 4, wherein said suction means comprises at least one suction cup.*

*6. The apparatus of claim 3, wherein said joint means comprises a substantially ball-like member operably carried by said mounting means, said ball-like member being rotatably coupled with said supporting means.*

*7. The apparatus of claim 6, wherein said supporting means includes means for frictionally, rotatably receiving said ball-like member.*

*8. The apparatus of claim 3, wherein said adjustable bracket means comprises a pair of opposed strap members for operably engaging said article operably coupled to said mounting member.*

*9. The apparatus of claim 8, said strap members each including first portions shiftably carried by said mounting member and second portions extending downwardly from said first portions, the lower end of each of said second portions being angled inwardly in facing relationship forming flanges, said flanges adapted to support said article.*

*10. The apparatus of claim 8, said mounting member including channel structure defining a pair of opposed channels for shiftably receiving said strap members.*

*11. The apparatus of claim 10, including friction means operably coupled with said channel structure for operably, frictionally engaging said strap member with said mounting member.*

*12. The apparatus as claimed in claim 3, said article being slidably receivable with said bracket means along an insertion path of travel, said bracket means being shiftable relative to said mounting member along a transverse path of travel generally normal to said insertion path of travel.*

* * * * *